United States Patent
Mueller et al.

(10) Patent No.: US 10,801,986 B2
(45) Date of Patent: Oct. 13, 2020

(54) MONITORING SENSOR FOR METERED AMOUNTS OF POWDER

(71) Applicant: Harro Hoefliger Verpackungsmaschinen GmbH, Allmersbach im Tal (DE)

(72) Inventors: Daniel Mueller, Allmersbach im Tal (DE); Thomas Puppich, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 30 days.

(21) Appl. No.: 16/248,380

(22) Filed: Jan. 15, 2019

(65) Prior Publication Data
US 2019/0219533 A1 Jul. 18, 2019

(30) Foreign Application Priority Data
Jan. 18, 2018 (EP) .................... 18152376

(51) Int. Cl.
*G01N 27/22* (2006.01)
*G01F 25/00* (2006.01)
*F16B 1/00* (2006.01)

(52) U.S. Cl.
CPC ....... *G01N 27/226* (2013.01); *G01F 25/0092* (2013.01); *F16B 2001/0035* (2013.01); *G01F 25/0084* (2013.01)

(58) Field of Classification Search
CPC .............. G01N 27/226; G01F 25/0092; G01F 25/0084
USPC ......................................................... 324/663
See application file for complete search history.

(56) References Cited

U.S. PATENT DOCUMENTS

| | | | |
|---|---|---|---|
| 9,022,063 B2* | 5/2015 | Powell | G01F 1/30 137/486 |
| 2010/0107775 A1 | 5/2010 | Wang et al. | |
| 2010/0326202 A1 | 12/2010 | Hisada et al. | |
| 2012/0036943 A1* | 2/2012 | Lehmann | A61M 15/009 73/861.42 |
| 2016/0040825 A1 | 2/2016 | Franklin | |

FOREIGN PATENT DOCUMENTS

EP 2187183 A1 5/2010

* cited by examiner

*Primary Examiner* — Reena Aurora
(74) *Attorney, Agent, or Firm* — Walter Ottesen, P.A.

(57) ABSTRACT

A monitoring sensor for metered amounts of powder includes a sensor sleeve to channel the metered amount of powder through it and a sensor base body, in which the sensor sleeve is held interchangeably. A holding plate is attached to the interchangeable sensor sleeve. The sensor base body has a contact surface for the holding plate. The monitoring sensor includes a holding magnet for pressing the holding plate against the contact surface.

17 Claims, 1 Drawing Sheet

MONITORING SENSOR FOR METERED AMOUNTS OF POWDER

CROSS REFERENCE TO RELATED APPLICATION

This application claims priority of European patent application no. 18152376.2, filed Jan. 18, 2018, the entire content of which is incorporated herein by reference.

BACKGROUND OF THE INVENTION

Especially in the pharmaceutical industry, powder-like formulations are employed, wherein suitable partial amounts from a powder stockpile need to be precisely measured or metered for the respective application. This occurs, for example, by means of roller or disk dispensers, which have metering bores with a calibrated volume. These metering bores are filled with the powder, so that partial amounts are produced with the volume of the respective metering bore. Such partial amounts can then be blown out and sent on to further processing, especially for filling in a target container.

With increasing demands on process safety, especially as regards the target amounts obtained, there is a need to check the measured amounts of powder for compliance with certain amount tolerances. For this, monitoring sensors are used, including in one known configuration a sensor base body and a sensor sleeve for channeling the metered amount of powder through it. The metered amount of powder is channeled through the sensor sleeve and herein subjected to a capacitive mass determination. For a precise and reproducible measurement result, a geometrical adaptation of the sensor sleeve to the format of the amount of powder to be tested is required. But since powders in different batches with different formats are processed on the same dosing device, the need for the geometrical adaptation also leads to different sensor sleeves having to be used.

So as not to need to keep on hand many different monitoring sensors, configurations are used in which the sensor sleeves are held interchangeably in the sensor base body. The user need herein only keep on hand a selection of format-dependent adapted sensor sleeves, while the sensor base body including its measuring and control electronics can be kept the same. During every format change, the adapting work on the monitoring sensor is limited to removing the existing sensor sleeve and replacing it with a sensor sleeve adapted to the format which is going to be processed.

Herein various difficulties occur in practice. Thus far, the sensor sleeves have been inserted into the sensor base body without locking. Due to vibrations or other actions of force, however, an axial shifting of the sensor sleeves cannot be ruled out. Furthermore, a rotational movement of the sensor sleeves was also possible. The mentioned unwanted relative movements may have a negative impact on the quality of the measurement signal and in the extreme case may even result in damage to the sensor. Attempts to attach them with O-rings have resulted in a tendency to damage when the sleeves are changed. On the whole, the pulling out and the installing of the sensor sleeves requires effort, which makes it difficult to retrofit the monitoring sensors installed in the machine, given the correspondingly cramped space conditions.

SUMMARY OF THE INVENTION

It is an object of the invention to further develop a monitoring sensor such that the interchangeability of the sensor sleeve is improved.

This object can, for example, be achieved via a monitoring sensor for metered amounts of powder. The monitoring sensor includes: a sensor sleeve configured to channel the metered amount of powder therethrough; a sensor base body; the sensor sleeve being held interchangeably in the sensor base body; a holding plate attached to the sensor sleeve; the sensor base body having a contact surface for the holding plate; and, the monitoring sensor including a holding magnet configured to press the holding plate against the contact surface.

According to an aspect of the invention, it is provided that on the interchangeable sensor sleeve there is attached a holding plate, by which the sensor sleeve and the holding plate form a jointly interchangeable unit. Furthermore, the sensor base body has a bearing face or contact surface for the holding plate, while the monitoring sensor includes a holding magnet for pressing the holding plate against the contact surface. It may be herein expedient that the holding magnet is attached to the holding plate, while the sensor base body has appropriately magnetically attractable properties. Preferably, however, the holding plate is made of a magnetically attractable material, while the holding magnet is positioned in the sensor base body. In any case, the invention accomplishes the fact that the sensor sleeve is positionally exactly fixed in the sensor base body. The magnetic pressing force reliably prevents shifting and rotational movements of the sensor sleeve relative to the sensor base body. Even so, when pulling out the sleeve the magnetic force can be manually overcome without major effort. The respective sensor sleeve can be easily removed or inserted without the presence of clamps or the like. The magnetic force which acts only in the immediate vicinity of the installation position does not interfere with this, yet at the same time it ensures a precise positioning in the operating position. A format change can be carried out without any problems, due to the significantly easier changeover of the sensor sleeves. The danger of damaging the sensor during the format change is significantly reduced. Thanks to the precise positional fixing, the reliability of the measurement is increased, while at the same time further costs due to the errors and problems known in the prior art are decreased.

In a further embodiment, a through opening is formed in the sensor base body, wherein the sensor sleeve in the mounted condition is held free of play in the through opening. In this way, it is achieved that the sensor sleeve is positioned and centered exactly in the plane of the contact surface and furthermore cannot perform any tilting movements, either. The holding plate pressed against the contact surface ensures a fixation in the axial direction, while the holding magnet positioned eccentrically to the longitudinal axis prevents a rotational movement of the structural unit of the sensor sleeve and the holding plate about the longitudinal axis. All of this results in a positioning and fixation in all lateral and rotational degrees of freedom, wherein this positioning adopted once is reliably maintained during the operation. This contributes to the consistency and precision of the measurement results.

Advantageously, in the mounted condition an electrically conducting connection exists between the holding plate and the sensor base body, accordingly an electrical grounding of the holding plate with respect to the sensor base body is produced. In this way, on the one hand, the measurement field inside the sensor sleeve is electrically shielded against external interfering influences, while on the other hand a scattering of the field lines of the measurement field to the outside from the measurement section is reduced. Thanks to the effective separation achieved between the measuring section and the surroundings, the reproducibility of the measurement result is further improved.

The monitoring sensor can have a blast nozzle for the sensor sleeve. The blast nozzle when viewed in the cross section of the sensor sleeve is advisedly oriented tangentially to a longitudinal axis of the sensor sleeve. It has to be indeed observed that powder residues can become deposited in the sensor sleeve, wherein the measurement value of the sensor changes on account of a change in the dielectric caused by the powder deposit. The blast nozzle now allows a blowing out and thus a cleaning of the interior of the sensor sleeve when needed or in fixedly predetermined cycles. The removal of possibly clinging powder residues that is accomplished in this way ensures constancy of the dielectric parameters, so that corresponding measurement errors are avoided. The eccentric, tangential orientation of the blast nozzle results in a helical swirling inside the sensor sleeve, which improves the cleaning action.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
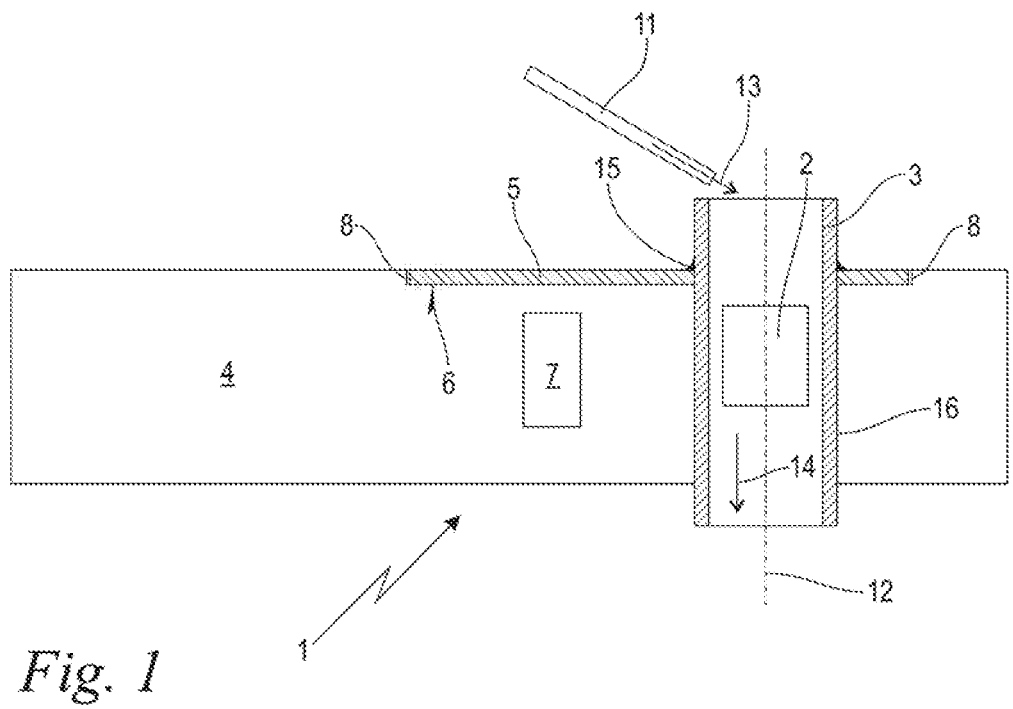
FIG. 1 shows in a schematic longitudinal section representation a monitoring sensor with sensor sleeve, holding plate, holding magnet and blast nozzle; and, FIG. 2 shows in a schematic top view the monitoring sensor of FIG. 1 with details on the positioning of the holding plate and on the tangential orientation of the blast nozzle.

FIG. 1 shows in a schematic longitudinal section representation a monitoring sensor 1 configured according to an embodiment of the invention for the mass determination of metered amounts of powder 2 only indicated schematically here. The metered amounts of powder 2 shown here are pharmaceutical powder plugs compacted into so-called pellets, which plugs have been previously metered and measured in a sliding dispenser in a previously known manner, and therefore not described here. The term amounts of powder 2 chosen here, however, includes in the scope of the disclosure loose, amorphous amounts of powder and also amounts of powder compressed into quasi-solids, such as pellets, tablets, or the like, especially from the pharmaceutical industry, but also from other industries such as for example from the food supplement industry. The metering may also occur in a roller dispenser, in a disk dispenser, via a pipette or the like, in a previously known manner. The monitoring sensor 1 is a sensor for capacitive mass determination of the amount of powder 2 and includes for this purpose a sensor sleeve 3 as well as a sensor base body 4. The sensor sleeve 3 extends along a longitudinal axis 12, running vertically here as an example, and serves to channel the metered amount of powder 2 through it from top to bottom corresponding to an arrow 14. The sensor base body 4 contains a capacitive measurement electronics, not shown. An electrical capacitance is formed, whose electric field reaches through the interior of the sensor sleeve 3. The amount of powder 2 passing through results in a dielectric change in the capacitance, which can be detected by the monitoring sensor 1 and converted into a measurement signal for the mass determination of the amount of powder 2.

For an exact and reproducible measurement, the internal cross section of the sensor sleeve 3 should be adapted to the format of the amount of powder 2 to be measured. The sensor sleeve 3 is therefore held interchangeably on the sensor base body 4. For measurements of amounts of powder 2 with differing format, differing sensor sleeves 3 adapted to the format are inserted into the sensor base body 4 shown here, after the sensor sleeve 3 shown here has been removed.

In order to achieve the mentioned interchangeability, a holding plate 5 is attached to the sensor sleeve 3 and forms an interchangeable unit together with the sensor sleeve 3. The mechanical connection between the holding plate 5 and the sensor sleeve 3 is formed here by an encircling adhesive joint 15, indicated schematically in FIG. 1, but a screwed or clamped connection or the like may also be expedient. Corresponding to the structural unit of sensor sleeve 3 and holding plate 5, the sensor base body 4 has a through opening 16 for the sensor sleeve 3 and also a bearing face or contact surface 6 for the holding plate 5. In the embodiment shown, the contact surface 6 is formed by a bottom of a receiving pocket 8, in which the holding plate 5 comes to rest.

In the sensor base body 4 there is arranged a holding magnet 7 which is positioned close to the contact surface 6 such that, in the operating position shown, the holding plate 5 including a magnetically attractable material is pressed against the contact surface 6. It may be herein expedient that the corresponding end face of the holding magnet 7 forms a portion of the contact surface 6 and consequently comes directly into contact with the holding plate 5. In the embodiment shown, however, the holding magnet 7 is positioned at a certain spacing from the contact surface 6, wherein the contact surface 6 covers the holding magnet 7 free of interruptions. By suitable dimensioning of the mentioned spacing, an adaptation of the active holding force can be produced, while the closed surface of the contact surface 6 contributes to the mechanical robustness and to easy cleanability. Alternatively to the arrangement shown, it may also be expedient to attach the holding magnet 7 on the holding plate 5, while the sensor base body 4 is formed at least in sections by a magnetically attractable material in the region of the contact surface 6. In any case, an axial pressing force is created, which ensures a permanent fixation of the sensor sleeve 3 relative to the sensor base body 4 during the operation, while at the same time an easy interchangeability is produced.

The sensor sleeve 3 includes an electromagnetically permeable, nonconductive material, namely, from a nonconductive plastic, for which in an embodiment PEEK (polyether ether ketone) is chosen. In this way, an electromagnetic, here capacitive, measurement field can be established in the interior of the sensor sleeve. The holding plate 5, on the other hand, is of an electrically conductive material, and the contact between the holding plate 5 and the contact surface 6 is also electrically conductive. The result therefrom is an electrical grounding of the holding plate 5 with respect to the sensor base body 4, as a consequence of which the measurement section situated in the interior of the sensor sleeve 3 for the mass determination of the amount of powder 2 is electrically shielded against external interfering influences.

It may further be seen in FIG. 1 that the monitoring sensor 1 has a schematically indicated blast nozzle 11 for the sensor sleeve 3. When needed, or at regular intervals, pressurized air or another suitable gas can be blown into the interior of the sensor sleeve 3 according to an arrow 13, in order to blow out powder residues possibly clinging there. For this, the blast nozzle 11 is inclined at an acute angle to the longitudinal axis 12 in the longitudinal section of the sensor sleeve 3, so that the blowing direction according to the arrow 13 lies neither parallel nor perpendicular to the longitudinal axis 12.

Figure 2:
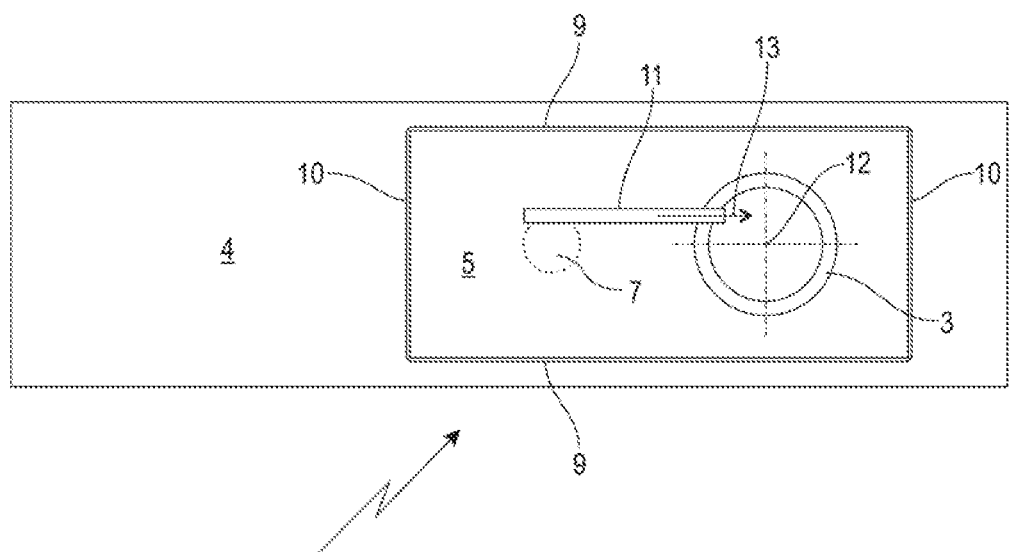

FIG. 2 shows in a schematic top view the monitoring sensor 1 of FIG. 1. It can be noticed here, first of all, that the blast nozzle 11 when viewed in the cross section of the sensor sleeve 3 is oriented excentrically, that is, tangentially to the longitudinal axis 12 of the sensor sleeve. It is seen from this, and considered together with FIG. 1, that a helical flow path is adjusted during the blowing out in the interior of the sensor sleeve 3, which is circular in the cross section.

Furthermore, it emerges from the consideration with FIGS. 1 and 2 that the receiving pocket 8 (FIG. 1) in the top view of FIG. 2 is bounded by two parallel opposite peripheral walls 9 as well as by two likewise parallel opposite peripheral walls 10 running at right angles to the former walls. The holding plate 5, when viewed in the plane of the contact surface 6, is somewhat smaller in dimension than the receiving pocket 8, therefore, that is, a gap remains each time between the edges of the holding plate 5 and the peripheral walls 9, 10 of the receiving pocket 8. The mounted sensor sleeve 3, on the other hand, sits free of play in the through opening 16 of the sensor base body 4. This seating free of play holds and centers the structural unit of sensor sleeve 3 and holding plate 5 in spatial directions perpendicular to the longitudinal axis 12, that is, in the plane of the contact surface 6, and furthermore prevents tilting movements about axes situated in the plane of the contact surface 6. Perpendicular to this, that is, in the direction of the longitudinal axis 12, the relative positioning is produced by supporting the holding plate 5 on the contact surface 6. The magnetic pressing force of the holding plate 5, extending perpendicular to the longitudinal axis 12, against the contact surface 6 furthermore brings about a positioning and securing of the structural unit of sensor sleeve 3 and holding plate 5 with regard to rotational movements about the longitudinal axis 12. Starting from this defined operating position, which is thus dictated and adopted, lateral shifting movements in all three spatial directions and also rotational and tilting movements about all three spatial axes are reliably prevented.

Upon a format change in the amounts of powder 2 to be measured, the structural unit of sensor sleeve 3 and holding plate 5 may now be pulled out from the sensor base body 4 coaxially to the longitudinal axis 12, overcoming the magnetic holding force. Conversely, a different structural unit of this kind with a cross section of the sensor sleeve 3 adapted to the new format of the amount of powder 2, yet with the same geometrical configuration of the holding plate 5, may now be used. The acting magnetic force results in a fixation and quasi-locking of the used sensor sleeve 3 in a relative position to the sensor base body 4 which is exactly oriented and also no longer changeable during the operation.

It is understood that the foregoing description is that of the preferred embodiments of the invention and that various changes and modifications may be made thereto without departing from the spirit and scope of the invention as defined in the appended claims.

What is claimed is:

1. A monitoring sensor for metered amounts of powder, the monitoring sensor comprising:
    a sensor base body having a contact surface formed thereon;
    a sensor unit including a sensor sleeve configured to pass the metered amounts of powder therethrough and a holding plate attached to said sensor sleeve and configured to removably seat on said contact surface so as to render said sensor unit interchangeable with another sensor unit; and,
    a holding magnet arranged to magnetically act on said holding plate to press said holding plate against said contact surface and so hold said sensor unit in place on said sensor base body.

2. The monitoring sensor of claim 1, wherein
    said holding magnet is positioned in said sensor base body.

3. The monitoring sensor of claim 1, wherein:
    said sensor base body has a through opening formed therein; and,
    said sensor sleeve, in a mounted state, is held free of play in said through opening.

4. The monitoring sensor of claim 1, wherein, in a mounted state, an electrically conducting connection exists between said holding plate and said sensor base body.

5. The monitoring sensor of claim 1 further comprising a blast nozzle for said sensor sleeve.

6. The monitoring sensor of claim 5, wherein:
    said sensor sleeve defines a longitudinal axis; and,
    said blast nozzle, when viewed in a cross section of said sensor sleeve, is oriented tangentially to said longitudinal axis of said sensor sleeve.

7. The monitoring sensor of claim 1, wherein said holding plate includes magnetically attractable material; and, said holding magnet is disposed in said sensor base body.

8. The monitoring sensor of claim 7, wherein said holding magnet is disposed in spaced relationship to said holding plate.

9. The monitoring sensor of claim 1, wherein said sensor sleeve is made of plastic.

10. The monitoring sensor of claim 1, wherein said holding magnet is attached to said holding plate; and, said sensor base body is formed, at least partially, of magnetically attractable material.

11. The monitoring sensor of claim 10, wherein said sensor base body is formed of a magnetically attractable material in the region of said contact surface.

12. A monitoring sensor for metered amounts of powder, the monitoring sensor comprising:
    a sensor base body having a contact surface formed thereon;
    a sensor unit including a sensor sleeve configured to pass the metered amounts of powder therethrough and a holding plate attached to said sensor sleeve and configured to removably seat on said contact surface so as to render said sensor unit interchangeable with another sensor unit;
    said holding plate including magnetically attractable material;
    a holding magnet arranged relative to said holding plate to magnetically act on said holding plate to press said holding plate against said contact surface and so hold said sensor unit in place on said sensor base body; and,
    said sensor sleeve being made of an electromagnetically permeable nonconductive material.

13. The monitoring sensor of claim 12, wherein said sensor sleeve is made of plastic.

14. The monitoring sensor of claim 12, wherein said holding magnet is disposed in said sensor base body.

15. A monitoring sensor for metered amounts of powder, the monitoring sensor comprising:

a sensor base body having a contact surface formed thereon;

a sensor unit including a sensor sleeve configured to pass the metered amounts of powder therethrough and a holding plate attached to said sensor sleeve and configured to removably seat on said contact surface so as to render said sensor unit interchangeable with another sensor unit;

said sensor base body including magnetically attractable material; and, a holding magnet attached to said holding plate to magnetically act on said holding plate to press said holding plate against said contact surface and so hold said sensor unit in place on said sensor base body.

16. The monitoring sensor of claim 15, wherein said sensor sleeve is made of plastic.

17. The monitoring sensor of claim 15, wherein said sensor base body is formed of a magnetically attractable material in the region of said contact surface.

* * * * *